United States Patent [19]

Chagnard, Jr. et al.

[11] Patent Number: 4,869,827

[45] Date of Patent: Sep. 26, 1989

[54] TREATMENT FOR WATER SYSTEMS TO INHIBIT CORROSION AND SCALE FORMATION

[75] Inventors: Harold A. Chagnard, Jr., Baton Rouge; Mark K. Brayden, Denham Springs; Thomas R. LeBlanc, Plaquemine, all of La.

[73] Assignee: The Dow Chemical Company, Midland, Mich.

[21] Appl. No.: 197,069

[22] Filed: May 18, 1988

Related U.S. Application Data

[62] Division of Ser. No. 61,648, Jun. 15, 1987, Pat. No. 4,774,018.

[51] Int. Cl.⁴ .............................................. C02F 5/14
[52] U.S. Cl. .................................. 210/700; 210/701; 422/15; 422/17; 422/19
[58] Field of Search ................................ 210/696–701; 252/181, 389.22, 389.53; 422/15, 17, 19

[56] References Cited

U.S. PATENT DOCUMENTS

| | | | |
|---|---|---|---|
| 3,976,589 | 8/1976 | Mitchell | 252/180 |
| 4,303,568 | 12/1981 | May et al. | 252/181 |
| 4,324,664 | 4/1982 | Snyder et al. | 210/701 |
| 4,324,684 | 4/1982 | Geiger et al. | 252/389 A |
| 4,640,818 | 2/1987 | Grierson et al. | 422/15 |
| 4,774,018 | 9/1988 | Chagnard et al. | 251/181 |

Primary Examiner—Peter Hruskoci
Attorney, Agent, or Firm—James M. Pelton; D. R. Howard

[57] ABSTRACT

This invention relates to an improved composition and method which inhibit the corrosion of and the formation of scale on metals present in an aqueous system. The composition comprises a water soluble copolymer having moieties derived from acrylic acid and from lower alkyl hydroxy acrylates, and a combination of a manganese compound and an aminoalkylenephosphonic acid derivative or its salts.

11 Claims, 1 Drawing Sheet

TREATMENT FOR WATER SYSTEMS TO INHIBIT CORROSION AND SCALE FORMATION

CROSS REFERENCE TO RELATED APPLICATION

This application is a division of application Ser. No. 061,648, filed June 15, 1987, now U.S. Pat. No. 4,774,018, issued Sept. 27, 1988.

BACKGROUND OF THE INVENTION

One of the main problems which occurs in hydraulic engineering is the corrosion of metals in both treated and untreated cooling water systems. The corrosion of metals such as steel, aluminum, brass and copper, which are commonly found in water systems, is primarily due to dissolved oxygen and carbon dioxide. Materials which remove oxygen, such as sodium sulfite or hydrazine, are not economical and are technically inadequate. Hence, $Zn^{++}$, chromates, molybdates, polyphosphates, ortho-phosphate, and organo-phosphonates are added to cooling water to form protective films on metal surfaces. Chromates are very efficient corrosion inhibitors. However, they are often environmentally undesirable due to the well known toxic effects. $Zn^{++}$ has similar environmental problems and it also has low solubility products with ortho phosphate, hydroxide and carbonate, which products can form sludge and deposits responsible for promoting corrosion. Polyphosphates are not as efficient as chromates and they are unstable in a cooling water environment; thus, they decompose by hydrolysis to ortho and pyro-phosphates which often cause sludge and deposits. Ortho-phosphates are not as efficient as chromates and, if they are not controlled properly, can also form sludge and deposits. Although organo-phosphonates provide some corrosion protection, they are not nearly as efficient as chromates.

In addition to the problem of metal corrosion, cooling water systems can deposit materials, such as calcium carbonate and calcium phosphate, on metal so as to form a scale thereon. Such scaling adversely affects heat transfer properties and liquid velocities in the cooling systems.

Therefore, it is an object of this invention to provide an improved method for treating aqueous systems, e.g., cooling water systems, which method efficiently provides a high level of protection against metal corrosion and the formation of scale.

SUMMARY OF THE INVENTION

This invention relates to an improved composition and method which inhibit the corrosion of and the formation of scale on metals present in an aqueous system. The composition comprises a water soluble copolymer having moieties derived from acrylic acid and from lower alkyl hydroxy acrylates, and a combination of a manganese compound and an aminoalkylenephosphonic acid derivative or its salts. The aminoalkylenephosphonic acid derivatives may also contain other functional groups, e.g., carboxyl, quaternary amine, hydroxyalkyl groups, and the like. The manganese compound must be capable of providing a manganese ion in the aqueous system. The method comprises adding to the aqueous system such composition in an amount to provide from about 10 ppm to about 200 ppm of the composition in the aqueous system. The method does not require controlling the pH of the aqueous system below 8—indeed, the method is efficacious at a pH as high as 9.

DETAILED DESCRIPTION OF THE INVENTION

Figure 1:
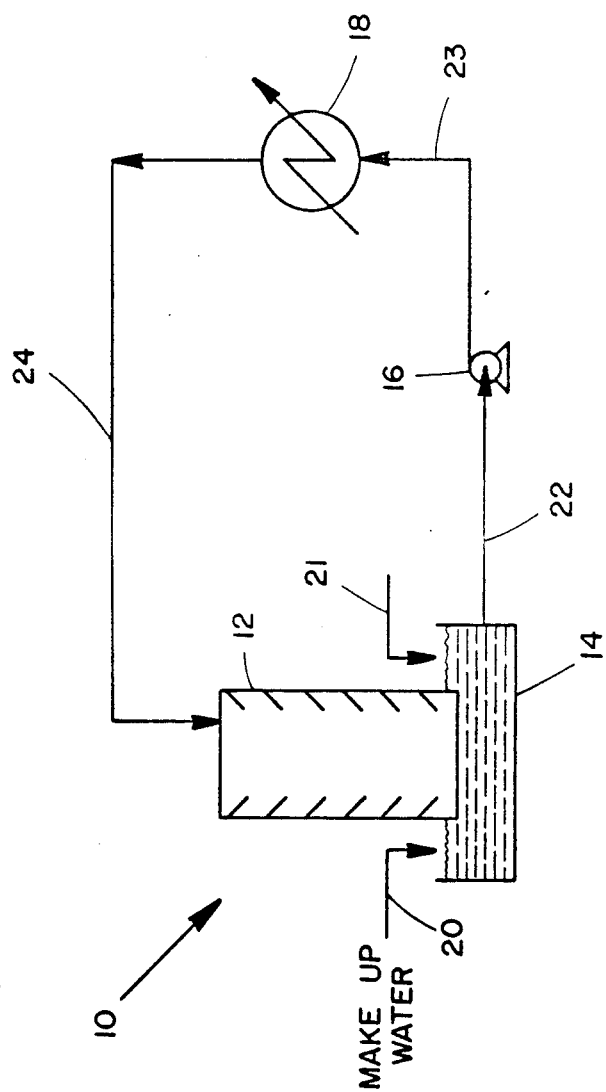
FIG. 1 is a schematic drawing of a typical open recirculating cooling water system.

The acrylic acid/lower alkyl hydroxyl acrylate derived copolymer component of the composition of this invention is used in known anti-scaling formulations and may be represented by the formula:

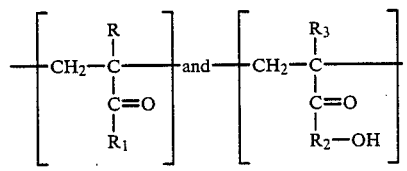

where R is hydrogen or a lower alkyl of from 1 to 3 carbon atoms, $R_1$ is OH, OM, $NH_2$, where M is a water soluble cation, e.g., $NH_4$, alkali metal (K, and Na), etc; $R_2$ is a lower alkyl having from about 2 to 6 carbon atoms (the OH substituent may be attached to any of the C atoms in the alkyl group) and $R_3$ is H or a lower alkyl of from 1 to 3 carbon atoms.

The acrylic acid derived moiety (AA) and the lower alkyl hydroxy acrylate derived moiety (AHA) of the copolymer most advantageously have a mole ratio of AA to AHA of from about 34:1 to about 1:4, and preferably 11:1 to 1:2. The copolymer has a molecular weight of from 500 to 1,000,000 and preferaly from 1,000 to 500,000. The only criteria that is of importance that applies to the molar ratio of AA to AHA is that it is desirable to have a copolymer which is soluble in water. It should be noted that as the proportion of the AHA increases, the sollubility of the copolymer decreases.

A preferred copolymer is one of the formula:

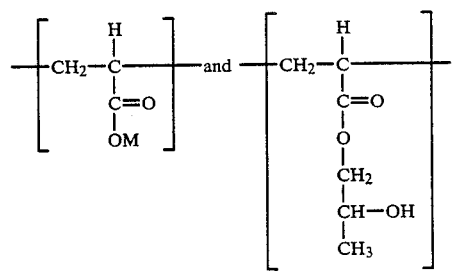

wherein M is as previously defined.

A preparation for AA and AHA and a preparation for the copolymer itself are disclosed in U.S. Pat. No. 4,324,664, which is incorporated herein by reference as if fully set forth.

The synergistic combination of manganese compounds and aminoalkylenephosphonic acid derivatives and/or their salts to provide metal corrosion protection is disclosed in U.S. Pat. No. 4,640,818. Synergism is shown by the fact that various aminoalkylenephosphonic acid derivat8ives, when used alone in hard or deionized water, do not provide a level of protection comparable to that which is provided by chromates, but when used with a manganese compound to provide a source of manganese ion in the water, corrosion inhibition is significantly enhanced.

The organic phosphonic acid derivatives which have been found useful in inhibiting corrosion of metals in the presence of manganese ions are aminophosphonic acid derivatives wherein the nitrogen and phosphorus are interconnected by an alkylene or substituted alkylene group, having the formula:

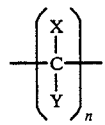

wherein X, Y are independently selected from hydrogen, hydroxyl, carboxyl, phosphonic, salts of the acid radicals and hydrocarbon radicals having from 1–12 carbon atoms and wherein n is 1–3, with the proviso that when n>1, each X and Y may be the same as or different from any other X or Y on any carbon atom.

The compounds can be prepared by a number of known synthetic techniques. Of particular importance is the reaction of compounds containing reactive amine hydrogens with a carbonyl compound (aldehyde or ketone) and phosphorus acid or derivative thereof. Detailed procedures can be found in U.S. Pat. No. 3,288,845, which is incorporated herein as if fully set forth.

The following structural formulas represent some of the complexing ligands which can be used in combination with the $Mn^{++}$ ion in inhibiting corrosion in the practice of the present invention:

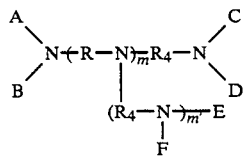

wherein substituents A, B, C, D, E and F are independently selected from hydrogen,

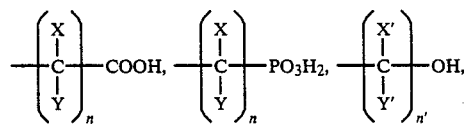

2-hydroxy-3-(trialkylammonium halide)propyl and 2-hydroxypropylsulfonic acid groups and salts of the acid radicals wherein X, Y, and n have been previously defined, X' and Y' are independently hydrogen, methyl or ethyl radicals, n' is 2 or 3 and m and m' each is 0–2500, with the proviso that at least about 50 percent of the amine hydrogens have been substituted by the phosphorus-containing group as previously defined herein, and wherein $R_4$ is a hydrocarbon residue which can be a linear, branched, cyclic, heterocyclic, substituted heterocyclic, or a fused ring-type structure; with the further proviso that when m or m'≧1, the E and F substituents may be the same as or different from any other substituent or any other nitrogen atom and each $R_4$ can be the same as or different from any other $R_4$.

Some specific, but non-limiting, examples of compounds which are included by the above structures are bis(aminomethyl)dicyclopentadienetetra(methylenephosphonic acid), bis(aminomethyl)bicycloheptanetetra(methylenephosphonic acid), ethylenediaminetetra(methylenephosphonic acid) (EDA-TMP), diethylenetriaminepenta(methylenephosphonic acid) (DETA-PMP), hydroxyethylethylenediaminetri(methylenephosphonic acid) (HEEDA-TMP), pentaethylenehexamineocta(methylenephosphonic acid), hexamethylenediaminetetra(methylenephosphonic acid), phosphonomethylated polyalkylene polyamines having molecular weights of about 100,000 or more, which may contain piperazine rings in the chain, [N(3,-trialkylammonium-2-hydroxypropyl)diethylenetriaminetetra(methylenephosphonic acid)]chloride, diethylenetriaminemonocarboxylmethyltetra(methylenephosphonic acid), ethylenediaminemono-2-hydroxypropylsulfonictri(methylenephosphonic acid), piperazinedimethylenephosphonic acid. The dicyclopentadiene and the bicycloheptane derivatives contain the dimethyltricyclodecane and dimethylnorbornane radicals, respectively.

Additional compounds useful in metal corrosion inhibition in the presence of manganese ions are disclosed in "New Metal Ion Control Agents Based on Dicyclopentadiene Derivatives", U.S. Pat. No. 4,500,470; "New Compounds Containing Quaternary Ammonium and Methylenephosphonic Acid Groups", U.S. Pat. No. 4,459,241; "Polymeric Alkylene Phosphonic Acid Piperazine Derivatives", U.S. Pat. No. 4,489,201; "Bis-(aminoalkyl)Piperazine Derivatives and Their Use as Metal Ion Control Agents", Ser. No. 583,526, filed Feb. 24, 1984; and "New Metal Ion Control Compounds Based on Norbornane", U.S. Pat. No. 4,500,469.

Organophosphonic acid derivatives containing other functional groups in addition to an alkylenephosphonic acid group (U.S. Pat. No. 3,288,846) as a nitrogen substituent can be prepared by the following methods.

Hydroxyalkyl groups can be substituted for a hydrogen of an amine by reacting the amine with an alkylene oxide in aqueous medium, e.g., proylene oxide (1,2-epoxypropane), as described in U.S. Pat. No. 3,398,198.

Alkylsulfonic acid groups can be substituted for an amine hydrogen by reacting the amine with a mixture of sodium bisulfite and an aldehyde, e.g., formaldehyde, to obtain an alkylene sulfonic acid group substituent on the nitrogen of the amine compound. This reaction is taught in "Preparation and Properties of Aminomethylenesulfonic Acids", J. Am. Chem. Soc. 77, 5512-15 (1955). Other alkylsulfonic acid derivatives can be made by reacting the amine with chloroalkylsulfonic acids or, as in U.S. Pat. No. 4,085,134, by reacting propane sultone with an amine.

Carboxyalkyl groups can be substituted for the hydrogens by reacting the alkali metal salt of organophosphonic amine derivative in alkaline medium with alpha,-beta-unsaturated carboxylic acids or their anhydrides, esters or nitriles. This process is more completely described in U.S. Pat. No. 4,307,038.

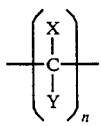

Another method for obtaining carboxyalkyl groups as substituents of the amine nitrogens is found in U.S. Pat. No. 3,726,912.

The 2-hydroxypropylsulfonic acid group may be substituted for an amine hydrogen by reacting the amine in aqueous solution with 3-chloro-2-hydroxy-1-propane-sulfonic acid in the presence of caustic (NaOH). The hydroxypropylsodiumsulfonate group is the nitrogen substituent. If the acid is desired, acidification with a strong acid, e.g., HCl, is sufficient to convert the sodium salt to the acid. This reaction is taught in U.S. Pat. No. 3,091,522.

The hydroxypropyltrimethylammonium chloride group may be substituted for an amine hydrogen by reacting the amine with an aqueous solution of 3-chloro-2-hydroxypropyltrimethylammonium chloride prior to the reaction to make the phosphonic acid derivative.

For the purpose of the present invention, effective aminoalkylenephosphonic acid derivatives described herein and salts thereof are considered equivalent. The salts referred to are the acid addition salts of those bases which will form a salt with at least one acid group of the aminoalkylenephosphonic acid derivative. Suitable bases include, for example, the alkali metal and alkaline earth metal hydroxides, carbonates, and bicarbonates such as sodium hydroxide, potassium hydroxide, calcium hydroxide, potassium carbonate, sodium bicarbonate, magnesium carbonate and the like, ammonia, primary, secondary and tertiary amines and the like. These salts may be prepared by treating the aminoalkylenephosphonic acid derivative having at least one acid group with an appropriate base.

The manganese compounds which may be employed as a source of manganese ion are $MnO$, $MnO_2 \cdot H_2O$, $KMnO_4$, $Mn(CH_3COO)_2 \cdot 4H_2O$ and the like. The manganese compound can be added simultaneously with the aminoalkylenephosphonic acid derivative or may be added separately to the water. Alternatively, the manganese can be complexed by the aminoalkylenephosphonic acid derivative prior to adding to the water. Preferred is a composition in which the weight ratio of aminoalkylenephosphonic acid derivative to manganese is at least about 2 to 1.

The AA/AHA copolymer and the combination of the manganese compound and the aminoalkylenephosphonic acid derivative (M/AAP) may be added to the aqueous system separately or together. The preferred rate of addition should be such that the composition is quickly solubilized in the aqueous system.

It is important that the composition of this invention contain a weight ratio of copolymer to M/AAP which is within the range of from about 7:1 to about 0.1:1. A preferred range is from about 4:1 to about 1:1. A most preferred ratio is about 2:1. When a weight ratio is used which provides an amount of copolymer which is less than that which a weight ratio of about 0.1:1 would provide, it has been observed that the anti-scaling effect is adversely affected. This phenomena is observed even in those cases where the amount of copolymer is kept constant and the amount of M/AAP is increased. Thus, the use of a weight ratio within the above stated range provides a beneficial synergistic effect between copolymer and M/AAP, which effect is quantitatively based.

The composition of this invention should provide a concentration in the aqueous system to be treated which is sufficient to provide at least: 2 ppm copolymer, 0.05 ppm $Mn++$ and 1 ppm aminoalkylenephosphonic acid derivative or its salt. An especially suitable range is from about 4 ppm to about 25 ppm copolymer, from about 0.1 ppm to about 0.5 ppm $Mn++$ and from about 2 ppm to about 10 ppm aminoalkylenephosphonic acid derivative or its salt. The ppm measurements used herein are by weight and are based upon one million parts of the aqueous system being treated.

If chlorine is used in the aqueous system, its affect on the anti-scaling characteristic of the composition of this invention should be monitored. When chlorine levels are kept too high, say, above 3.5 ppm total available chlorine, there is a loss in scaling protection. The chlorine level which is acceptable can be determined for each system by observation and by lowering of the chlorine content and/or by lowering of the amount of copolymer used in the composition. This adjustment is empirical in nature and is dependent upon the aqueous system involved and upon the degree of scaling protection sought by the practitioner.

As before mentioned, the use of the composition of this invention in aqueous systems is not dependent upon control of the system pH between 7 and 8 as is the case for other compositions. Excellent anti-corrosion and anti-scaling results are obtained even when the system pH is 9 or higher. It is to be understood that control of the pH between 7 and 8 is not deleterious to the effects accomplished by the subject composition and method and may be practiced where such pH control is desirable for reasons other than corrosion and scaling inhibition.

In some aqueous systems, the failure to control the pH at a value between 7 and 8 will result in some loss of microbiological control. Control can be re-obtained by the use of a biocide in the aqueous system. An exemplary biocide is SLIMICIDE J-12 which is a quaternary ammonium/tin biocide, sold by Betz Laboratories, Inc., Trevose, Penn.

In FIG. 1, a typical open recirculating cooling water system is schematically shown. The system, generally designated by the numeral 10, includes a water tower 12 and a water tower sump 14. Makeup water is added to sump 14 via line 20. The compositions of this invention are also added to sump 14 by way of line 21. Water is drawn from sump 14 through line 22 by way of circulating pump 16. The output side of circulating pump 16 feeds line 23 with cooled water from sump 14. Cooled water is used to achieve an exchange of heat, be it in a heat exchanger, in an air conditioning system, etc. This point of heat exchange is represented in the drawing by heat exchanger 18. After the exchange of heat, the now warmed water is circulated through return pipe 24 back to cooling tower 12.

The following Examples are illustrative of the practice of the invention unless otherwise indicated.

EXAMPLES

The compositions of this invention, which are indicated in the following examples, were used to treat an open, recirculating cooling water system. The major operative components of the system are shown in FIG. 1.

The compositions were metered into the cooling water at the cooling tower sump. Since the corrosion and scaling sought to be measured normally require a long period of time to occur, it was deemed expedient to use various devices and techniques to accentuate corrosion and scaling effects.

Corrosion was measured by the use of a portable corrosion rate instrument manufactured by Petrolite Instruments of Houston, Tex. The device gives instantaneous corrosion rate values. Tables 1-5 show the values obtained measured as 1/1000 inches (mils) of metal lost per year (mpy).

To corroborate the instantaneous corrosion rate values, $\frac{1}{2}''\times 3''\times 1/16''$ coupons of mild steel and admiralty brass were also located in the system. The coupons were located in the hot water return line to the cooling tower in an ASTM designed rack. The coupons were left in the system for the period of time indicated in Table 6 and were measured in accordance with ASTM D2688. The corrosion rate is reported in mpy. The industry standards of 1 mpy for mild steel and 0.1 mpy for admiralty brass, as can be seen in Table 6, have been significantly bettered by the composition and method of this invention.

The scaling effect was measured by the use of a heated probe monitor, in particular, a MONITALL TM device, developed by Betz Laboratories, Inc., of Trevose, Penn. Harsh conditions were obtained by use of the probe monitor and were 12,500 BTU/hr/ft$^2$ and 1 ft/sec linear velocity. These conditions greatly accelerate treatment evaluation. Comparable scaling levels noted in heat exchangers for a month period were reproduced with the use of the monitor probe in two weeks.

The scaling effect is reported as a fouling rating and is shown in Tables 1-5. The fouling rating is a time-adjusted derivative of the fouling factor and is equal to the fouling factor divided by the duration, in days, of the test. The fouling factor is expressed by the equation, $$\text{Fouling Factor} = \frac{\text{final temp. difference (F.°)} - \text{initial temp. difference (F.°)}}{\text{heat flux }(Q/A)\text{ BTU/hr/ft}^2}$$

The following scale was used in evaluation,

Excellent, E, $<0.5 \times 10^{-5}$ fouling factor/day
Good, G, 1 to $5 \times 10^{-5}$ fouling factor/day
Fair, F, 5 to $10 \times 10^{-5}$ fouling factor/day
Poor, P, $>10 \times 10^{-5}$ fouling factor/day In general, most heat exchangers are designed to tolerate a fouling factor of 0.002. An E reading would take approximately 100 days at 12,500 BTU/hr/ft$^2$ at 1 ft/sec. A P reading would take approximately 10 days under these same conditions.

The water treated in the cooling system had the following mineral analysis,

|  | Average mg/l | Typical Max mg/l |
| --- | --- | --- |
| Hardness as CaCO$_3$ | 140 | 180 |
| Calcium as Ca | 39 | 49 |
| Magnesium as Mg | 10.6 | 14.5 |
| Sodium as Na | 19 | 33 |
| Potassium as K | 2.9 | 3.9 |
| Bicarbonate (alkalinity) | | |
| as HCO$_3$ | 120 | 160 |
| Sulfate | 48 | 73 |
| Chloride | 21 | 35 |
| Total Dissolved Solids | 230 | 300 |
| Silica | 6.0 | 8.4 |

The cooling water analysis was, in general, the above times the number of cycles of concentration.

The cooling system operating parameters were as follows,

|  | Design | Measured |
| --- | --- | --- |
| Water Recirculation Rate, GPM | 15,000 | 15,910 |
| Hot Water Temperature, Deg. F. | 100 | 105.5 |
| Cold Water Temperature, Deg. F. (corrected for pump heat) | 90 | 94.3 |
| Range (Delta T), Deg. F. | 10 | 11.2 |
| Wet Bulb Temperature, Deg. F. | 80 | 79.0 |
| Approach, Deg. F. | 10 | 15.3 |
| Ambient Temperature, Deg. F. | — | — |

The pH of the water was unregulated except as where indicated and, in general, the pH ranged between 8 and 9.

TABLE 1

| Days of Treatment | Component of Composition-Concentration in Water ppm | | Corrosion Rate (mils per year) | | Fouling Rate |
| --- | --- | --- | --- | --- | --- |
| | M/AAP$^2$ | Betz 2020 | Mild Steel | Admiralty Brass | |
| 22 | 30-60 | 20 | 0.1 | <0.1 | G |
| 6 | 35-55 | 10 | 0.1 | <0.1 | F |
| 8 | 20-40 | 10 | 0.1 | <0.1 | F |
| 10 | 15-60 | 10 | 0.1 | <0.1 | P |
| 3 | 20-30 | 10 | 0.1 | <0.1 | — |
| 15 | 15-35 | 20 | 0.1 | <0.1 | G |
| 15 | 15-25 | 20 | 0.1 | <0.1 | G |
| 6 | 15-50 | 20 | 0.1 | <0.1 | P |
| 8 | 15-40 | 10 | 0.1 | <0.1 | P |
| 10 | 20-30 | 20 | 0.1 | <0.1 | G |
| 11 | 10 | 20 | 0.1 | <0.1 | E |
| 15 | 20 | 40 | 0.1 | <0.1 | E |
| 13 | 15 | 30 | 0.1 | <0.1 | E |
| 15 | 15 | 30 | 0.1 | <0.1 | E |
| 21 | 15 | 30 | 0.1 | <0.1 | E[1] |

[1]Reduced Flow on Monitor 1 ft/sec; all other 2 ft/sec.
[2]Mn++ provided by MnO$_2$ aminoalkylenephosphonic acid derivative is diethylenetriaminepentamethylenephosphonic acid; weight ratio of 1:23; product is 33% active.
Betz 2020 is an aqueous solution of AA/HAA copolymer sold by Betz Laboratories, Inc.

TABLE 2

| Days of Treatment | Component of Composition-Concentration in Water ppm | | Corrosion Rate (mils per year) | | Fouling Rate |
| --- | --- | --- | --- | --- | --- |
| | M/AAP$^2$ | PAA | Mild Steel | Admiralty Brass | |
| 15 | 20 | 40 | 0.1 | <0.1 | E |
| 21 | 20 | 40 | 0.1 | <0.1 | G[1] |

[1]Reduced Flow on Monitor 1 ft/sec
[2]Mn++ provided by MnO$_2$ and aminoalkylenephosphonic acid derivative is diethylenetriaminepentamethylenephosphonic acid; weight ratio of 1:23; product is 33% active.
PAA is 30% active and sold by ALCO.

TABLE 3

| Days of Treatment | Component of Composition-Concentration in Water ppm | | Cycles | Corrosion Rate (mils per year) | | Fouling Rate |
| --- | --- | --- | --- | --- | --- | --- |
| | M/AAP[2] | DE-1000 | | Mild Steel | Admiralty Brass | |
| 11 | 10 | 25 | 4.5 | 0.3 | <0.1 | G[1] |
| 9 | 15 | 30 | 4.5 | 0.2 | <0.1 | G[1] |
| 10 | 10 | 20 | 3.5 | 0.2 | <0.1 | E[1] |

[1]Reduced Flow on Monitor 1 ft/sec
[2]Mn++ provided by MnO$_2$ and aminoalkylenephosphonic acid derivative is diethylenetriaminepentamethylenephosphonic acid; weight ratio of 1:23; product is 33% active.
DE-1000 is an aqueous solution of a modified AA/HAA copolymer and sold by BETZ.

TABLE 4

| Days of Treatment | Component of Composition-Concentration in Water ppm | | Corrosion Rate (mils per year) | | Fouling Rate |
| --- | --- | --- | --- | --- | --- |
| | M/AAP[2] | N-8301 | Mild Steel | Admiralty Brass | |
| 11 | 10–90 | 20–80 | 0.1 | <0.1 | G[1] |
| 6 | 25 | 40 | 0.1 | <0.1 | G[1] |
| 31 | 20 | 30 | <0.1 | <0.1 | E[1] |

[1]Reduced Flow on Monitor 1 ft/sec
[2]Mn++ provided by MnO$_2$ and aminoalkylenephosphonic acid derivative is diethylenetriaminepentamethylenephosphonic acid; weight ratio of 1:23; product is 33% active.
N-8301 is NALCO 8301, a calcium phosphate dispersant, sold by Nalco Chemical Company.
Runs were through 3–4 cycles.

TABLE 5

| Days of Treatment | Component of Composition-Concentration in Water ppm | | Cycles | Corrosion Rate (mils per year) | | Fouling Rate |
| --- | --- | --- | --- | --- | --- | --- |
| | M/AAP[3] | Betz 2020 | | Mild Steel | Admiralty Brass | |
| 8 | 15 | 30 | 3.5 | 0.1 | <0.1 | E |
| 4 | 15 | 30 | 4.0 | 0.1 | <0.1 | E |
| 5 | 19 | 38 | 4.5 | 0.1 | <0.1 | E |
| 5 | 20–30 | 40–70 | 4.0 | 0.1 | <0.1 | E |
| 27 | 15 | 30 | 4.4 | 0.1 | <0.1 | E |
| 16 | 20 | 40 | 4.5 | 0.3 | <0.1 | E |
| 29 | 15 | 30 | 4.0 | 0.3 | <0.1 | E |
| 9 | 20 | 40 | 5.0 | 0.3 | <0.1 | E |
| 3 | 20 | 40 | 6.0 | 0.3 | <0.1 | E |
| 7 | 15 | 35 | 5.0 | 0.3 | <0.1 | E |
| 21 | 25 | 60 | 7.0 | 0.3 | <0.1 | G |
| 8 | 12 | 31 | 4.5 | 0.1 | <0.1 | E |
| 23 | 17 | 35 | 5.3 | 0.2 | <0.1 | E |
| 8 | 14 | 29 | 4.5 | 0.2 | <0.1 | G |
| 28 | 12 | 23 | 4.2 | 0.2 | <0.1 | G |
| 18 | 13 | 55[2] | 4.5 | 0.1 | <0.1 | G |
| 5 | 14 | 56[2] | 4.4 | 0.1 | <0.1 | E |

[1]Reduced Flow on Monitor 1 ft/sec
[2]Half 2020 and half DE-1000
[3]Mn++ provided by MnO$_2$ and aminoalkylenephosphonic acid derivative is diethylenetriaminepentamethylenephosphonic acid; weight ratio of 1:23; product is 33% active.
Betz 2020 is an aqueous solution of AA/HAA copolymer sold by Betz Laboratories, Inc.
DE-1000 is an aqueous solution of a modified AA/HAA copolymer and sold by BETZ.

TABLE 6

| | CORROSION COUPON DATA | |
| --- | --- | --- |
| | Mild Steel | Admiralty Brass |
| Days | mpy | mpy |
| 52 | 0.3 | 0.09 |
| 66 | 0.18 | 0.05 |
| 83 | 0.14 | 0.07 |

We claim:

1. A process for inhibiting corrosion of and the formation of scale on metals in an aqueous system having a pH between about 8 and about 9, said process comprising, adding to said aqueous system an effective amount of a composition containing a water soluble polymer having moieties derived from acrylic acid and moieties derived from lower alkyl hydroxy acrylates and the combination of an organic aminoalkylenephosphonic acid derivative and a manganese compound capable of providing a manganese ion in the aqueous system.

2. The process of claim 1 wherein said composition provides, to said aqueous system, at least 2 ppm of said copolymer, at least 0.05 ppm of said manganese ion, and at least 1 ppm of said aminoalkylenephosphonic acid derivative.

3. The process of claim 2 wherein said copolymer is of the formula

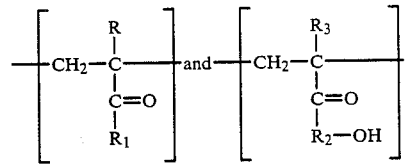

where R is hydrogen or a lower alkykl of from 1 to 3 carbon atoms, $R_1$ is OH, OM, NH$_2$, where M is a water soluble cation; $R_2$ is an alkyl having from about 2 to 6 carbon atoms; $R_3$ is H, or an alkyl having from 1 to 3 carbon atoms and the OH substituent may be attached to any of the C atoms in the alkyl group.

4. The process of claim 3 wherein R is CH$_3$; $R_1$ is OM; $R_2$OH is CH$_2$CHOHCH$_3$ and $R_3$ is H.

5. The process of claim 4 wherein the molecular weight of said copolymer is between 500 and 1,000,000 and the molar ratio of said acrylic acid derived constituent to said alkyl hydroxyl acrylate constituent is from about 34:1 to about 1:4.

6. The process of claim 1 wherein the weight ratio of said copolymer to said combination is within the range of from about 7:1 to about 0.1:1.

7. The process of claim 1 wherein the alkylene radical constituent of said organic aminoalkylenephosphonic acid derivative is

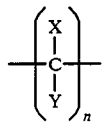

wherein X, Y are independently selected from hydrogen, hydroxyl, carboxyl, phosphonic, salts of the acid radicals and hydrocarbon radicals having from 1-12 carbon atoms and wherein n is 1-3, with the proviso that when n>1, each X and Y may be the same as or different from any other X or Y on any carbon atom.

8. The process of claim 7 wherein said manganese ion is in a chelated form.

9. The process of claim 1 wherein said organic aminoalkylenephosphonic acid derivative has the structure of

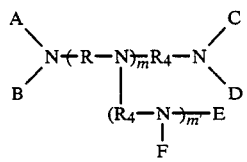

wherein substituents A, B, C, D, E and F are independently selected from hydrogen,

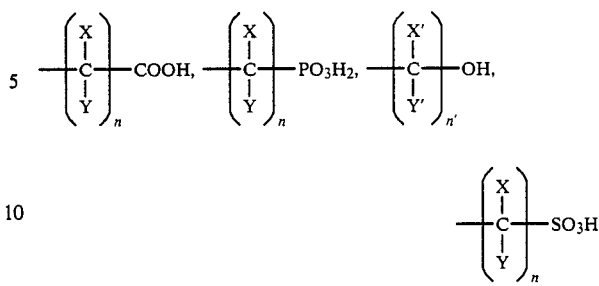

2-hydroxy-3-(trialkylammonium halide)propyl and 2-hydroxypropylsulfonic acid groups and salts of the acid radicals, wherein X and Y are independently selected from hydrogen, hydroxyl, carboxyl, phosphonic salts of the acid radicals and hydrocarbon radicals having from 1-12 carbon atoms, n is 1-3, with the proviso that when n>1, each X and Y may be the same as or different from any other X or Y on any carbon atom, X' and Y' are independently hydrogen, methyl or ethyl radicals, n' is 2 or 3 and m and m' each is 0-2500, with the proviso that at least about 50 percent of the amine hydrogens have been substituted by the phosphorus-containing group as previously defined herein, and wherein $R_4$ is a hydrocarbon residue which can be a linear, branched, cyclic, heterocyclic, substituted heterocyclic, or a fused ring-type structure; with the further proviso that when m or m' ≧ 1, and E and F substituents may be the same as or different from any other substituent of any other nitrogen atom and each $R_4$ can be the same as or different from any other $R_4$.

10. The process of claim 9 wherein the manganese ion is in a chelated form.

11. The process of claim 1 wherein the manganese compound is selected from the group conisting of MnO, $MnO_2 \cdot H_2O$, $KMnO_4$, $Mn(CH_3COO)_2 \cdot 4H_2O$ and mixtures thereof.

* * * * *